(12) United States Patent
Smith

(10) Patent No.: US 7,571,315 B1
(45) Date of Patent: Aug. 4, 2009

(54) METHOD AND APPARATUS TO ASSIGN TRUST TO A KEY

(75) Inventor: Ned M. Smith, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/397,455

(22) Filed: Sep. 16, 1999

(51) Int. Cl.
*H04L 29/06* (2006.01)
*H04L 9/00* (2006.01)
*H04L 9/08* (2006.01)
*H04K 1/00* (2006.01)
*G06F 1/00* (2006.01)
*G06F 9/445* (2006.01)

(52) U.S. Cl. .................. 713/158; 713/155; 380/30; 380/44; 380/286

(58) Field of Classification Search .............. 713/158, 713/171, 181, 175, 155, 159, 157; 380/277, 380/286, 30, 278, 44
See application file for complete search history.

(56) References Cited

U.S. PATENT DOCUMENTS

| | | | | |
|---|---|---|---|---|
| 5,214,702 A | * | 5/1993 | Fischer | 713/157 |
| 5,680,458 A | * | 10/1997 | Spelman et al. | 380/277 |
| 5,774,552 A | * | 6/1998 | Grimmer | 713/156 |
| 6,215,872 B1 | * | 4/2001 | Van Oorschot | 380/30 |
| 6,560,706 B1 | * | 5/2003 | Carbajal et al. | 713/155 |

FOREIGN PATENT DOCUMENTS

WO    WO 0116731 A1 * 3/2001

OTHER PUBLICATIONS

Paul Kocher, Ruby Lee, Gary McGraw, Anand Raghunathan, Srivaths Ravi, "Security as a new dimension in embedded system design", Jun. 2004, DAC '04: Proceedings of the 41st annual conference on Design automation, pp. 753-760.*

* cited by examiner

*Primary Examiner*—Matthew B Smithers
*Assistant Examiner*—Courtney D Fields
(74) *Attorney, Agent, or Firm*—Schwabe, Williamson & Wyatt, P.C.

(57) ABSTRACT

A method includes determining whether a key is traceable to one of a set of keys associated with a trusted source and determining whether the key is identified in a list of compromised keys. If the key is not identified as compromised and is traceable to one of the keys in the set, the key is assigned a trusted status.

19 Claims, 5 Drawing Sheets

METHOD AND APPARATUS TO ASSIGN TRUST TO A KEY

BACKGROUND

1. Field

The invention relates to the field of information security and, more particularly, to the assigning of trust to a key employed in an electronic operation.

2. Background Information

In modern computing environments, it is desirable to identify the authenticity, integrity and authority of software modules seeking access to data/or and services for which access may be restricted. For example, on a computer system comprising software modules from a variety of sources, including commercial software vendors, the Internet, and private bulletin board services, it may be useful to restrict access by some modules to services that read, write, or otherwise modify information on the computer system mass storage device (for example, a hard drive). A computer system may be any device comprising a processor to execute instructions and a memory to store the instructions. For example desktop computers, laptop computers, hand held computers and set-top boxes are all examples of what may comprise a computer system. As used herein, the term "software module" may refer to any form of packaging (that is, organizing and grouping) sequences of software instructions, for example executable programs, statically-linked libraries, dynamically-linked libraries, applets, objects, and many other forms of packaging and organization for software sequences well known in the art.

One technique for providing security is to associate a secret value, sometimes called a key, with each software module seeking access. If the possessor of the key may be traced back to a trusted source, such as, for example a "Certificate Authority" such as Verisign Inc. of Mountain View, Calif., the module or modules associated with the key may be trusted with access to select services and data.

One difficulty with this approach is that keys may be "compromised", meaning that secret components of their value may become known to a third party not intended to possess such knowledge. In well-known public-private key systems, such as the RSA Public Key Cryptosystem (1977), secret values may be compromised in a number of ways, including through inadvertent disclosure of the private key, or through reverse engineering (sometimes known as key or code "cracking") of data or software encrypted with the key.

When a key is compromised, the parties with unauthorized access to the key may impersonate authorized parties to obtain access to the secure services or data available to those with legitimate knowledge of the key. Consequently, it may be desirable to "revoke" the trusted status of the key so that it may no longer be used for access to secure data and services. Once revocation occurs, it may be difficult or impossible for software modules authorized to rely on the key to continue accessing the secure data or services because, along with the unauthorized parties, their access is revoked along with the trusted status of the key.

Software modules relying upon the revoked keys may embed an identification of the revoked key within the binary file or files comprising the modules themselves. In this circumstance, the software module may be re-compiled, re-linked, and redistributed with a new embedded key whose trust has not been compromised. Recompilation, re-linkage, and redistribution of software modules may be an arduous and expensive process. Therefore, there exists a continuing need for techniques to assign trust in a new key once trust in a key has been compromised.

SUMMARY

One embodiment of a method includes determining whether a key is traceable to one of a set of keys associated with a trusted source and determining whether the key is identified in a list of compromised keys. If the key is not identified as compromised and is traceable to one of the keys in the set, the key is assigned a trusted status.

This and other embodiments are described in the following description. In light of the description and accompanying figures, numerous other aspects and implementations of the present invention may become readily apparent. The scope of the invention should be construed in light of the accompanying claims and not limited to the particular embodiments described.

BRIEF DESCRIPTION OF THE DRAWINGS

The subject matter regarded as the invention is particularly pointed out and distinctly claimed in the concluding portion of the specification. The invention, however, may be further understood by reference to the following detailed description read with reference to the accompanying drawings.

DETAILED DESCRIPTION

Figure 1:
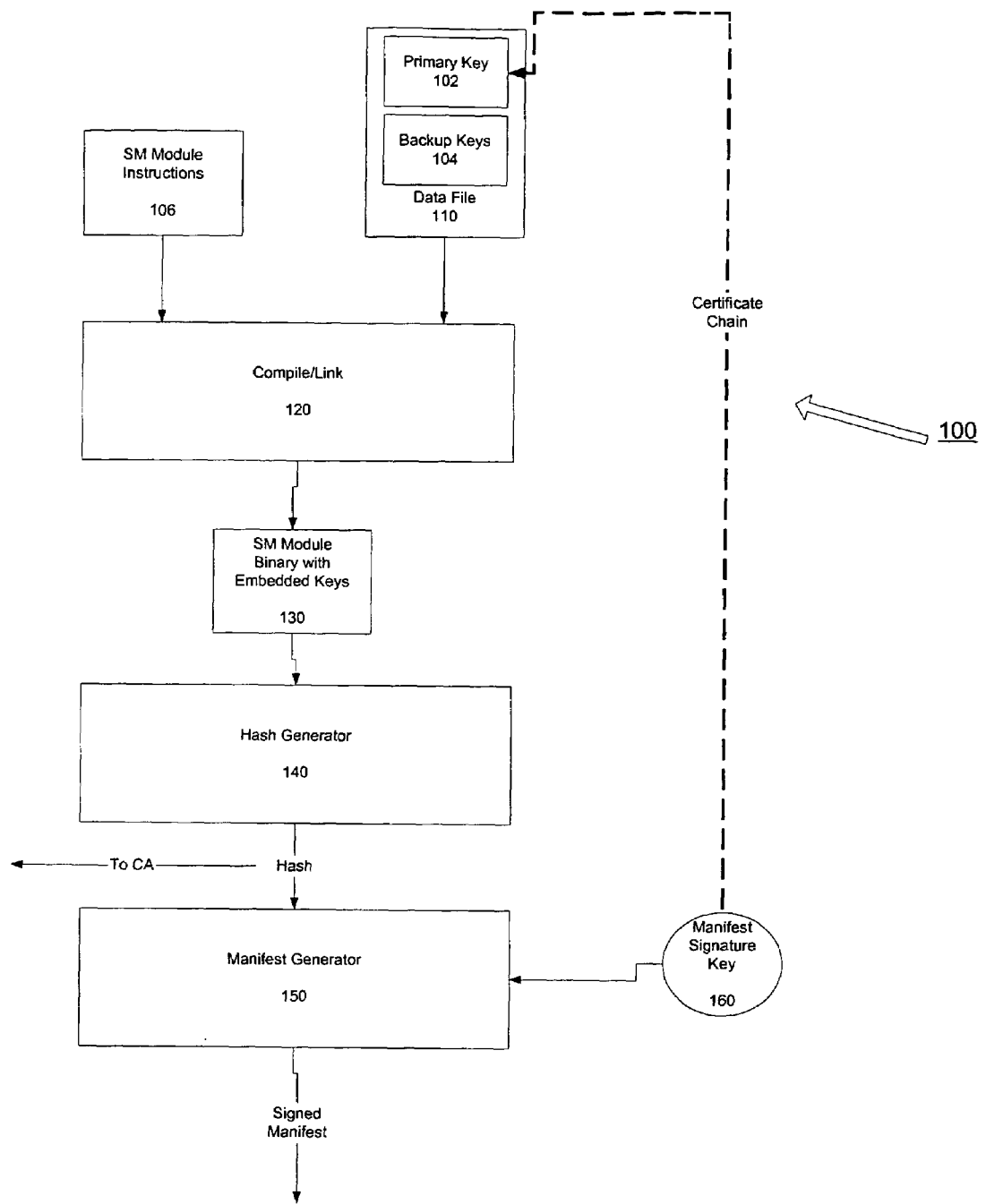
FIG. 1 is a flow chart illustrating an embodiment of a process to manufacture a security manager module and the manifest for the security manager module in accordance with the present invention.

The present invention involves a technique to assign trust in a key to be used by software modules in electronic operations. The embodiments described herein are merely illustrative, and one skilled in the art will appreciate that numerous modifications can be made which, nonetheless, fall within the scope of the present invention.

In this description, the private component of a public/private key pair may be referred to as the "private key" and the public component may be referred to as the "public key". Typically, in a manner well-known in the art of digital security, a "digital signature" may be generated by computing the hash value of a body of information, such as a data document or a sequence of program instructions, and then applying the private key to transform the generated hash value. A signature may be "verified", that is, determined to have been generated by the party or parties associated with the private key, by computing a second hash value on the body of information, then applying the public key component to the encrypted hash value corresponding to the private key value and comparing the hash values for a match. If the hatch values match, the recipient of the signature may have confidence that the signed body of information originated from a party associated with the private key and, further, that the body of information is unaltered from its state when the signature was generated. Again, methods of generating and verifying signatures are well-known in the art of digital security.

A "manifest" typically comprises one or more files containing attributes of another data file or software module. The manifest may typically comprise a hash value of the other file and an identification of the key used to sign the manifest. Using the identified key, a signature may be generated on the manifest. When the key used to sign the manifest is trusted, the integrity of the information comprised by the signed manifest may also be trusted. In order to provide a measure of trust in the signing key, it may be possible to trace the signing key through a "certificate chain" back to a trusted source. This trusted source may be a key issued by a trusted party, such as a Certificate Authority (CA). Verisign Inc. is an example of a CA. The certificate chain may comprise one or more "digital certificates", that is, files comprising a key which are signed by keys which are closer in the chain of trust to the trusted source. For example, a bank may be assigned a private key for performing digital signatures. This private key may be assigned to the bank by a CA. A certificate for the bank's key may be issued by the CA, in the form of a file comprising the bank's key, signed by the CA's key. The CA's key may be described as the "anchor" of the trust extending to the bank's key. Certificates and certificate chains are well known by those of ordinary skill in the art of digital security; see, for example, Recommendation X.509 V.3 (1994) from the International Telecommunication Union.

The certificate chain may be comprised by the manifest for a software module, or it may be stored separately from the manifest. The hash value comprised by the manifest may be used to verify the integrity of the software module with which the manifest is associated, and may also serve to associate the manifest with the software module by utilizing the unique character of the hash value.

In one embodiment, one software module may control access to secure data and services in a computer system. This module may be called the security manager (SM). When another module in the computer system requests access to secure data or services, the SM may verify the integrity and trusted status of (henceforth referred to as cross-checking) the other software module (henceforth referred to as the client module). For example, when a client module requests access, the SM may consult the manifest for the client module. A hash value for the client module may be stored in this manifest. The SM may generate a hash value of the client module and compare it with the hash value stored in the manifest. A match provides an indication regarding the integrity of the module to ensure that the module has not been tampered with. The SM may perform a hash on the manifest itself and compare it with the hash value comprised by the manifest signature. If those values match, they provide an indication of the integrity of the manifest itself and, hence, the hash value comprised by the manifest, providing further verification of the client module's integrity.

To determine whether the client module is associated with a trusted source, the SM may read from the client module manifest an identification of the public key component corresponding to the private key used to sign the manifest. Using this public key component, the SM may trace the association of the signing key back to the trusted source using a certificate chain. The certificates of the certificate chain may be comprised by the manifest or may be accessible separately from the manifest. For example, in one embodiment the key for the trusted source, to which the certificate chain traces back to, may be embedded within the binary file comprising the SM.

The SM may have an associated manifest similar to the manifest for the client module. In one embodiment, the manifest for the SM may comprise a hash value for the SM which the SM may use to verify its own integrity (self-check) in a manner similar in the manner in which the SM determines the integrity of the client module (cross check). The SM manifest may further comprise the public key component corresponding to the private key used to sign the SM manifest which, in a manner similar to the pubic key for the client module, may be associated with a trusted source through a certificate chain. The SM manifest may or may not comprise the certificate chain. The public key associated with the trusted source may be the same public key to which the public key of the client module was traced through the client certificate chain. As previously noted, this public key component may be embedded in an SM binary file.

FIG. 1 shows one embodiment 100 of a process to produce an SM module and the manifest for the SM module. The instructions 106 comprising the SM module, and a data file 110 may be input to a compilation/linking tool 120 (the compiler and linker may comprise separate tools). The data file may comprise a primary key 102 and one or more backup keys 104. In one embodiment, the primary key 102 and backup keys 104 comprise public keys which are trusted by the SM for performing secure operations, such as accessing secure data and services on a computer system. The compiler/linker 120 may output an SM binary image 130 suitable for loading into the memory of a computer system, and comprising the instructions 106 of the SM in binary form, e.g. machine language, and further comprising the key values from the data file 110 embedded within the binary image 130. In one embodiment, the key values 102,104 are embedded in a data area of the SM binary 130. In another embodiment, the key values 102,104 may be encoded in such a manner as to make their detection more difficult by unauthorized third parties examining the binary image 130, such as may take place with the aid of debugging or disassembly tool.

The SM binary 130 may be input to a hash generator 140 to generate a hash value unique to the SM binary 130 with a high degree of confidence. In other words, it would be highly improbable that another input to the hash generator 140 would result in the same hash value. In one embodiment, this hash value may be archived by a trusted authority, such as a Certificate Authority, to be employed in a manner to be described later. The hash value, along with a private key 160, may be input to a manifest generator 150. Other information (not shown) to be comprised by the manifest may also be input to the manifest generator 150. The manifest generator 150 may output a manifest for the SM signed with the private key 160. In one embodiment, in addition to comprising the hash value of the SM, the manifest may comprise an identification of the public key corresponding to the private key 160 or a hash of this public key. The private key 160 may be traceable, by way of a certificate chain (the dotted line in FIG. 1), back to the primary key 102 embedded in the SM binary 130. The certificate chain may be comprised by the manifest or separate from it.

Figure 2:
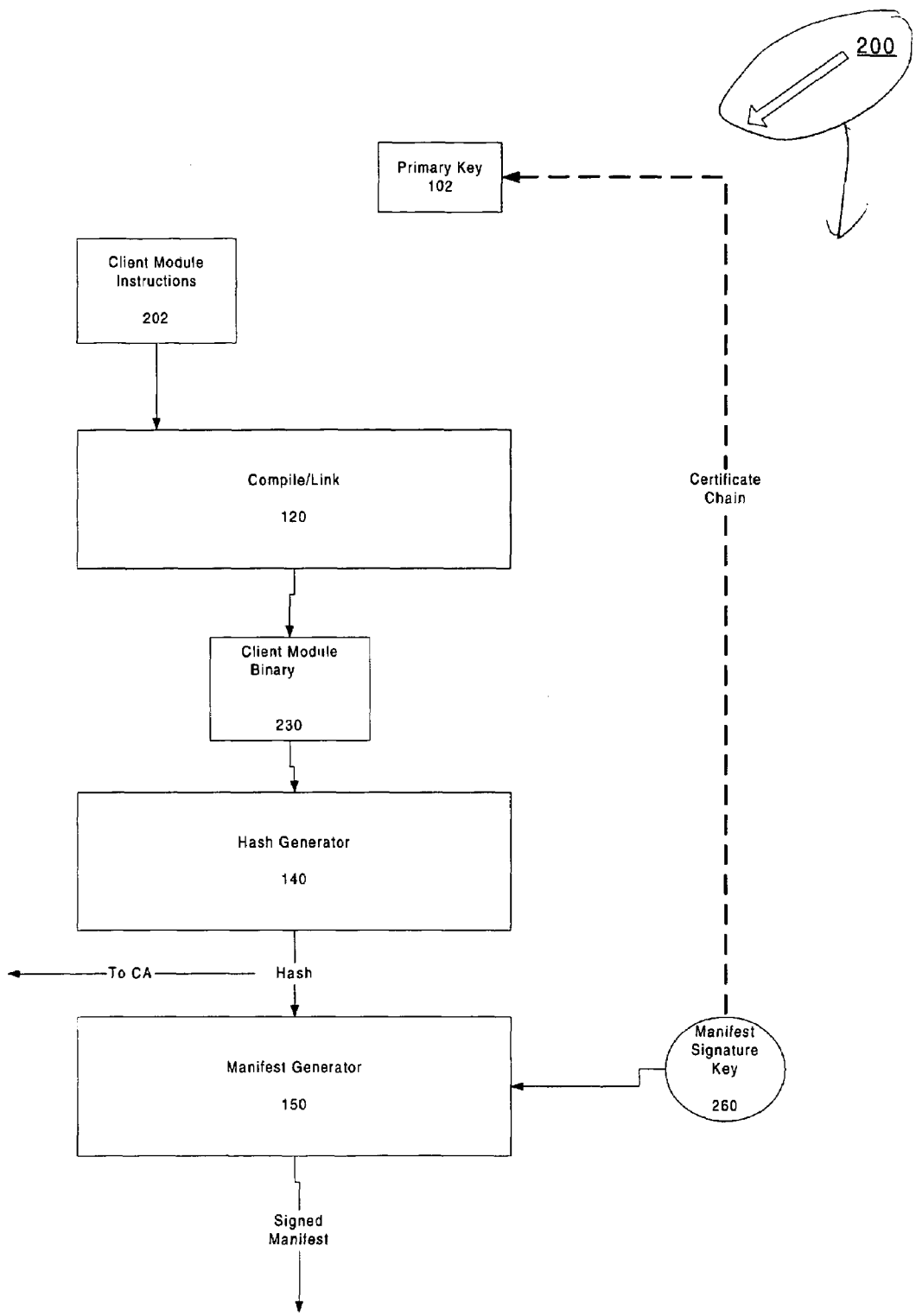
FIG. 2 is a flow chart illustrating an embodiment of a process to manufacture the manifest for a client module of the security manager in accordance with the present invention.

FIG. 2 shows an embodiment 200 of a process to produce the manifest for a client module of the SM, in other words, a software module to request secure data or services from the SM. Client module instructions 202 may be input to a compiler/linker 120 to produce a client binary 230. Unlike the SM binary 130, the client binary 230 may not have embedded key values. The client binary 230 may be input to a hash generator 140 to produce a hash value for the client binary 230. The hash value may be archived with a trusted authority such as a Certificate Authority. The hash value, along with a private key 260, may be input to manifest generator 150 to produce a manifest for the client module 230, signed by private key 260. The manifest may comprise an identification of the public key corresponding to private key 260 used to used to sign the manifest. The manifest may further comprise the hash value of the client binary 230. The manifest may also comprise a certificate chain through which the key 260 used to sign the manifest may be traced back to a key associated with a trusted authority such as a Certificate Authority. The certification chain may also be separate from the manifest. In one embodiment, both the key 260 used to sign the client manifest and the key 160 used to sign the SM manifest are traceable back to the trusted primary key 102 embedded within the SM binary 130.

Embodiments in accordance with the present invention may employ manifest technology to provide a new trusted key to replace a compromised trusted key, such as a compromised primary key 102. Using such embodiments, it may be possible to revoke a compromised key without recompiling and redistributing the software modules that rely upon the compromised key. It may not be necessary to provide third parties, such as Certificate Authorities, with access to the source or binary code for these software modules when a key is compromised. Instead, these third parties may archive a hash of the software modules, which may then be distributed along with a new trusted key in a signed manifest. Because the archived hash is comprised by a manifest signed by a new trusted key, software modules can trust the integrity of the archived hash value when performing self or cross checks for module integrity.

When a key is compromised, a revocation manifest may be issued, for example by a Certificate Authority responsible for maintaining and managing trust in the compromised key value. In one embodiment, the revocation may be issued in the form of a new manifest comprising an identification of a replacement key to be relied upon by software modules previously relying upon the compromised key.

Figure 3:
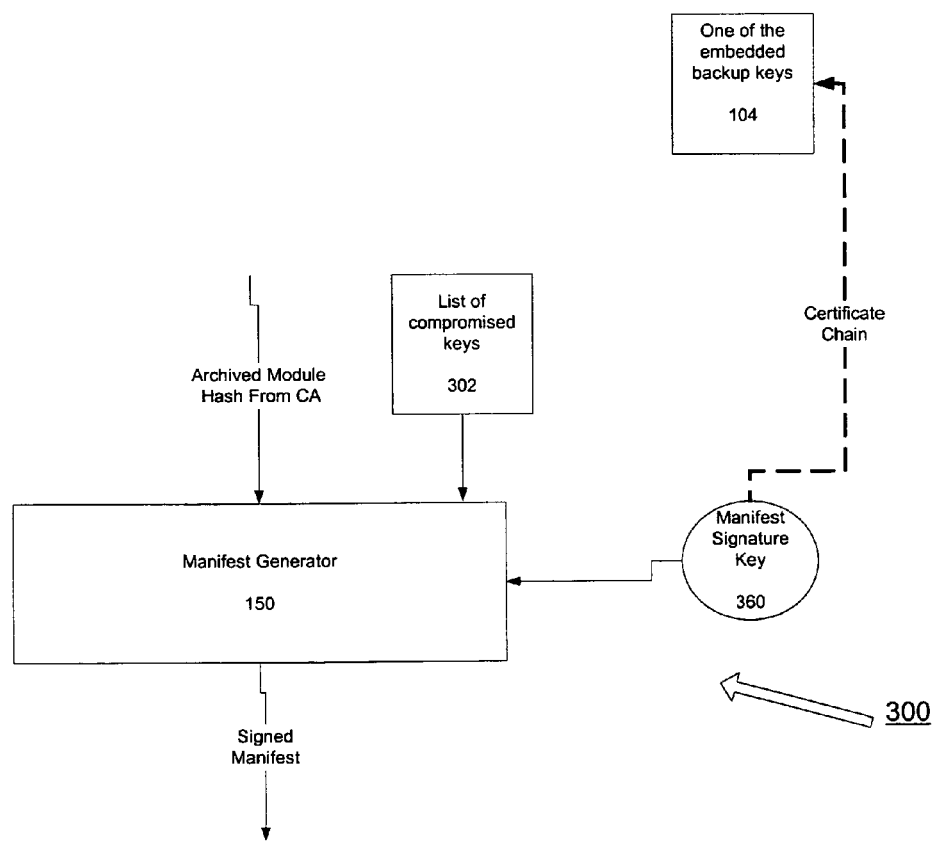
FIG. 3 is a flow chart illustrating an embodiment of a process to create a revocation manifest in accordance with the present invention.

FIG. 3 shows an embodiment 300 of a process to produce a revocation manifest identifying compromised keys. An original hash of the SM, possibly archived by a Certificate Authority, is input to a manifest generator 150 along with a list 302 identifying one or more compromised keys and a key 360 for signing the manifest. A private key 360 may be used to generate a signature on the manifest and an identification (such as a hash or the key value itself) of the public key component may be comprised by the manifest. The key 360 to sign the manifest may be traceable through a certificate chain to a trusted key. In one embodiment, the trusted key to which the certificate chain may be traced comprises one of the back-up keys embedded in the SM.

Figure 4:
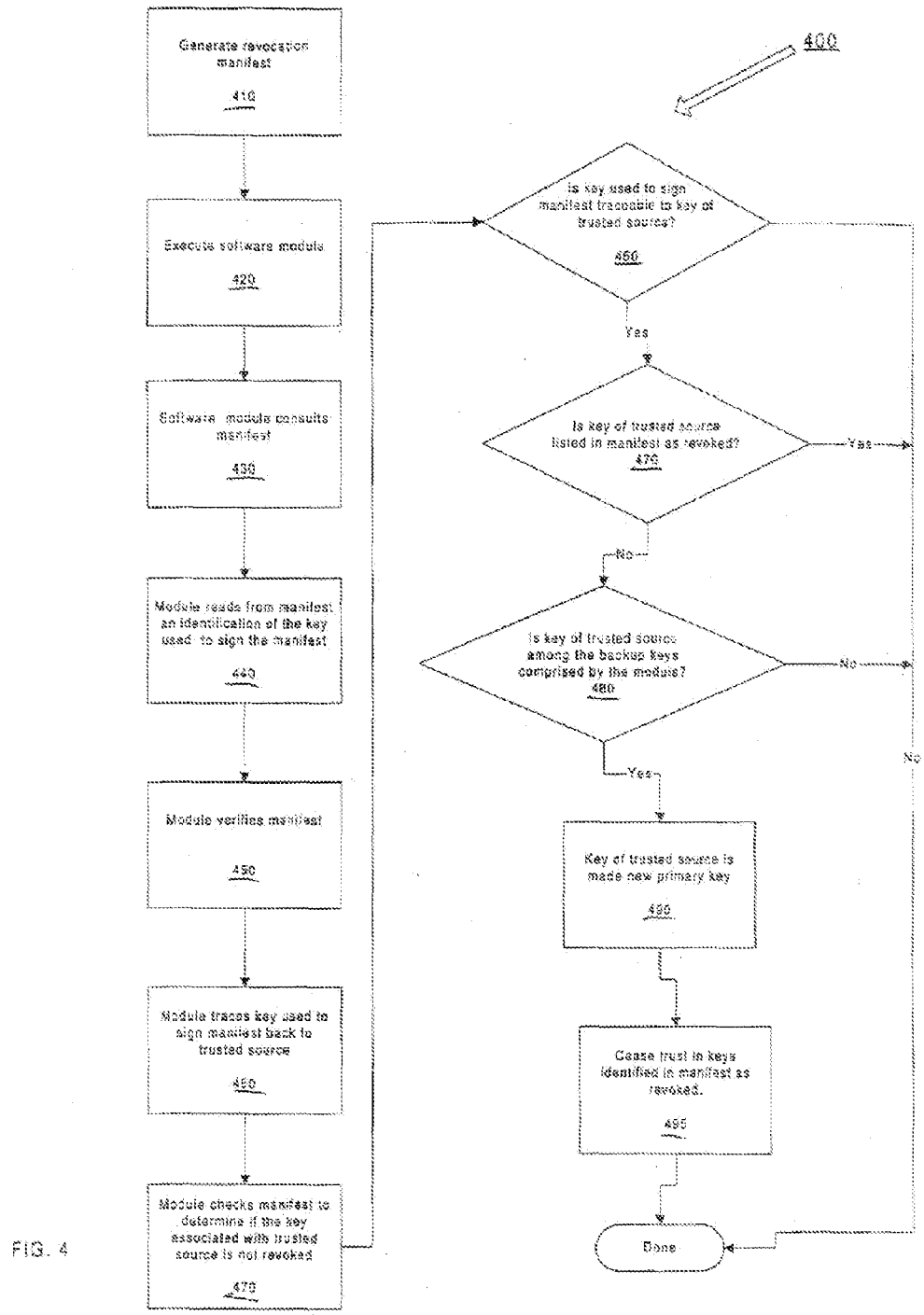
FIG. 4 is a flow chart illustrating an embodiment of a process by which trust may be assigned to a key relied upon by a software module to self-check itself or cross-check other modules, in accordance with the present invention.

FIG. 4 is a flow chart illustrating an embodiment of a process by which trust may be assigned to a key relied upon by a software module to self-check itself or cross-check other modules, in accordance with the present invention. When a trusted key employed by a software module is compromised or suspected of compromise, a revocation manifest may be generated at 410, for example by the embodiment as illustrated in FIG. 3. The revocation manifest may be associated with the module by way of a hash value of the module comprised by the manifest. When the module is executed at 420 by a computer system, for example, by a personal computer, the module reads the manifest at 430. The module may read at 440 from the manifest an identification of the key used to sign the manifest, such as, for example, the public key component or a hash of the public key component of the signing key. The module may then verify the manifest at 450 by generating a hash on the manifest and comparing it with the hash comprised by the manifest signature. If the values match the module may have confidence in the integrity of the manifest, e.g. the manifest contents have not been tampered with since the signature was generated. However, additional processing may be employed before the module may trust the contents of the manifest. The module may trace at 460 the key used to sign the manifest through a certificate chain back to a trusted source. Also, the module may check at 470 that the key associated with this trusted source is not identified in the manifest as a compromised key. If the key used to sign the manifest is found to be associated with a trusted source and is not identified among the list of compromised keys, the module may read at 480 the list of backup keys, which in one embodiment may be embedded in the module binary, to determine if the key of the trusted source is identified there. If the key of the trusted source is identified in the backup list, the module may trust this key as the new primary key 490. This new primary key may be relied upon by the module for self and cross checks, among other secure operations. Further, the module may trust other modules whose manifest signature keys associate with the new primary key, either directly or through a certificate chain.

As a result of this procedure, the module may cease to trust 495 any keys identified as compromised in the revocation manifest. Trust in these keys is therefore revoked. If the module had previously trusted a key identified as compromised, employing the present invention may result in the software modules revoking their trust in that key and trusting a new key, without requiring a recompilation or redistribution of the software modules. The software modules may instead trust one of the backup keys.

Figure 5:
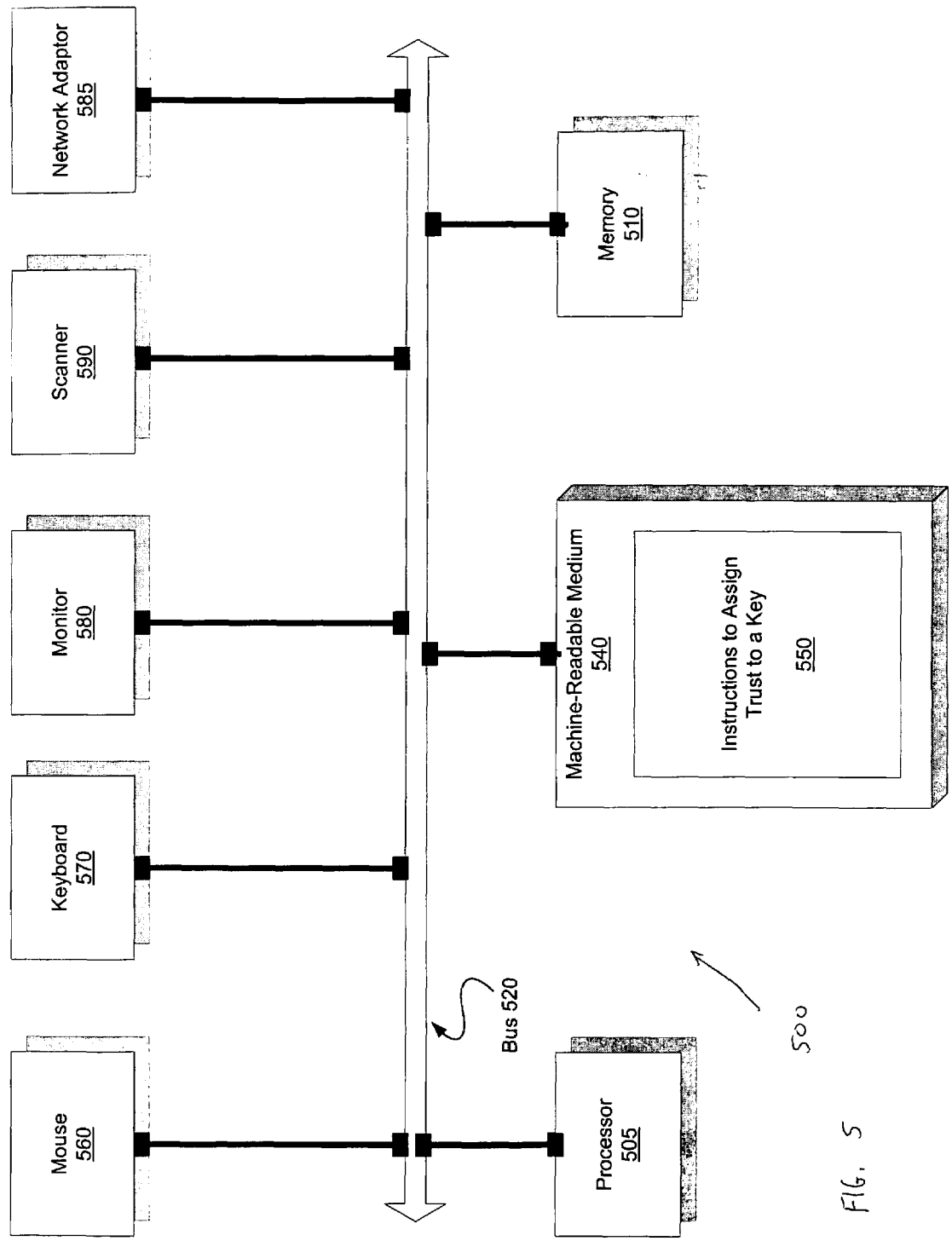
FIG. 5 is a schematic diagram illustrating an embodiment of an apparatus to revoke trust in a key value in accordance with the present invention.

FIG. 5 shows an embodiment of an apparatus to assign trust in a new key. Referring now to FIG. 5, embodiment 500 comprises a processor 505 to execute instructions supplied from a bus 520. The executed instructions are stored in a memory 510 from which they are supplied to the processor 510 by the bus 520 for execution. The processor 505 may be implemented using any semiconductor fabrication technology and may execute any instruction set including, but not limited to, instruction sets supported by an Intel Corporation Pentium® processor or compatible processor. The bus 520 may be implemented using technologies for propagating signals including, but not limited to, electronic and optical conductors. The memory may include random access memory (RAM), read-only memory (ROM), or any other form of memory capable of storing instructions which may then be supplied to the processor 505 by the bus 520 for execution. Embodiment 500 may include a machine-readable storage medium 540 to store instructions which may be loaded into volatile memory 510 from which they may be supplied to processor 505 for execution. The machine-readable storage medium 540 may include, but is not limited to, a hard drive, a floppy drive, and a CD-ROM or other optical disk.

One skilled in the art will appreciate that in "diskless" devices without mass storage mediums, the machine-readable storage medium 540 may be omitted from the embodiment 500. Instructions, including instructions 550 to assign trust in a new key, may then be stored in RAM, ROM, or other memory from which instructions may be accessed over the bus 520 by the processor 505 for execution.

To perform signal input/output, embodiment 500 may comprise a mouse 560, a keyboard 570, a display 580, and a scanner 590, each coupled to the bus 520 for transmitting data so that it may be easily accessed or manipulated by a user. The embodiment 500 may further include a network adapter 585 to couple the embodiment 500 to a network. Of course, the invention is not limited in scope to this particular embodiment.

In accordance with the present invention, embodiment 500 may comprise instructions 550 to revoke trust in a key or secret value stored on the machine-readable storage medium 540. Execution of the instructions may result in the apparatus performing the method embodiment illustrated in FIG. 4. Of course, the invention is not limited in scope to this particular embodiment.

The machine-readable storage medium 540 may comprise RAM, ROM, a floppy disk, and hard disk, a CD ROM, or any other memory capable of storing sequences of instructions which may be executed by a computer system. Of course, those skilled in the art will appreciate that the instructions may not occur in a particular order or in particular groups. Also, alternate embodiments could include additional instructions for performing other functions different from or supplementing the instructions to revoke trust in a key. The manner of producing the machine-readable storage medium 540 storing instructions, such as instructions to assign trust to a new key, are well-known in the art and to elaborate in detail would merely obscure the description of the present invention.

In summary, a method and apparatus to revoke trust in a key has been described. In one embodiment, a signed manifest may be issued comprising identifications of a key or keys whose trust is compromised. The key used to sign the manifest may be traceable to a trusted key which, in one embodiment, is among a list of backup keys embedded in a software module relying on the compromised key. A software module may verify the manifest signature and confirm the association of the signature key with a trusted source. If the trusted source key is among the backup keys embedded in the module, the module may revoke trust in the compromised key and assign trust to the trusted key. Recompilation and redistribution of the software module may thus be avoided. Of course, the invention is not limited to the embodiments described. For example, one or more of the operations of the method embodiment of FIG. 4 may be carried out by hardware circuits or a cooperation of hardware circuits and software modules.

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

What is claimed is:

1. A method comprising:
    reading from a software module binary a set of keys associated with a trusted source, wherein the set of keys is embedded in the software module binary, the set of keys having been compiled and linked with a software module to generate the software module binary;
    determining whether a key is traceable to one of the keys in the set of keys, the key being presented by or read from a document comprising a digital signature of the software module binary;
    determining whether the key is identified in a list of compromised keys; and
    if the key is not identified as compromised and is traceable to one of the keys in the set of keys, assigning the key a trusted status.

2. The method of claim 1 further comprising:
    verifying the integrity of the document, the document further comprising the list of compromised keys.

3. The method of claim 1 in which determining whether the key is traceable to one of the keys in the set of keys further comprises:
    tracing the key through a certificate chain to one of the keys in the set of keys.

4. The method of claim 1 wherein the digital signature is a hash of the software module binary.

5. The method of claim 2 in which the document is a manifest signed by the key.

6. The method of claim 1 in which determining whether the key is identified in the list of compromised keys further comprises:
    searching the list of compromised keys for the key.

7. A method comprising:
    producing a document comprising an identification of a software module binary and a list of compromised keys;
    digitally signing the document using a key presented by or read from the document and traceable to one key of a set of keys, wherein the set of keys is embedded in the software module binary, the set of keys having been compiled and linked with a software module to generate the software module binary; and
    making the document available on a communication network by which computer systems comprising the software module binary may read the document.

8. The method of claim 7 in which the identification of the software module binary comprises a hash value of the software module binary.

9. The method of claim 7 in which the key is traceable to one of the keys in the set of keys embedded in the software module binary by way of a certificate chain.

10. A device comprising:
    a processor;
    a machine-readable storage medium coupled to the processor by way of a bus, the storage medium storing instructions which, when executed by the processor, cause the device to
        read from a software module binary a set of keys associated with a trusted source, wherein the set of keys is embedded in the software module binary, the set of keys having been compiled and linked with a software module to generate the software module binary,
        determine whether a key is traceable to one of the keys in the set of keys, the key being presented by or read from a document comprising a digital signature of the software module binary,
        determine whether the key is identified in a list of compromised keys, and
        if the key is not identified as compromised and is traceable to one of the keys in the set of keys, assign the key a trusted status.

11. The device of claim 10 in which the instructions, when executed by the device, further cause the device to:
    verify the integrity of the document, the document further comprising the list of compromised keys.

12. The device of claim 10 in which the instructions, when executed by the device, further cause the device to:
    trace the key through a certificate chain to one of the keys in the set of keys.

13. A device comprising:
    a processor;
    a machine-readable storage medium coupled to the processor by way of a bus, the storage medium storing instructions which, when executed by the processor, cause the device to:

produce a document comprising an identification of a software module binary and a list of compromised keys; and digitally sign the document using a key presented by or read from the document and traceable to one key of a set of keys, wherein the set of keys is embedded in the software module binary, the set of keys having been compiled and linked with a software module to generate the software module binary;

wherein the key is traceable to one of the keys in the set of keys embedded in the software module binary by way of a certificate chain.

14. The device of claim 13 in which the identification of the software module binary comprises a hash value of the software module binary.

15. An article comprising a machine-readable medium having stored thereon instructions which, when executed by a processor, result in:

reading from a software module binary a set of keys associated with a trusted source, wherein the set of keys is embedded in the software module binary, the set of keys having been compiled and linked with a software module to generate the software module binary;

determining whether a key is traceable to one of the keys in the set of keys, the key being presented by or read from a document comprising a digital signature of the software module binary;

determining whether the key is identified in a list of compromised keys; and if the key is not identified as compromised and is traceable to one of keys in the set of keys, assigning the key a trusted status.

16. The article of claim 15 in which the instructions, when executed by the processor, further result in:

verifying the integrity of the document, the document further comprising the list of compromised keys.

17. The article of claim 15 in which the sequence of instructions, when executed by the processor, further result in:

tracing the key through a certificate chain to one of the keys in the set of keys.

18. An article comprising a machine-readable medium having stored thereon instructions which, when executed by a processor, result in:

producing a document comprising an identification of a software module binary and a list of compromised keys; and digitally signing the document using a key presented by or read from the document and traceable to one key of a set of keys, wherein the set of keys is embedded in the software module binary, the set of keys having been compiled and linked with a software module to generate the software module binary;

wherein the identification of the software module binary comprises a hash value of the software module binary.

19. The article of claim 18 in which the key is traceable by way of a certificate chain to one of the keys in the set of keys embedded in the software module binary.

* * * * *